(12) United States Patent
Chen et al.

(10) Patent No.: US 7,451,283 B2
(45) Date of Patent: Nov. 11, 2008

(54) METHOD, SYSTEM, AND PROGRAM FOR COPYING TRACKS BETWEEN A PRIMARY STORAGE AND SECONDARY STORAGE

(75) Inventors: James Chien-Chiung Chen, Tucson, AZ (US); Minh-Ngoc Le Huynh, San Jose, CA (US); Chung Man Fung, San Francisco, CA (US); Patricia Ching Lu, Fremont, CA (US); Edwin K. Scott, Tucson, AZ (US); Carol Santich Mellgren, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 10/754,291

(22) Filed: Jan. 9, 2004

(65) Prior Publication Data

US 2005/0154846 A1 Jul. 14, 2005

(51) Int. Cl.
*G06F 12/16* (2006.01)

(52) U.S. Cl. .......................... 711/162; 711/161; 714/6; 714/718

(58) Field of Classification Search .................. 711/162, 711/161; 714/6
See application file for complete search history.

(56) References Cited

U.S. PATENT DOCUMENTS

| | | | | |
|---|---|---|---|---|
| 5,673,381 | A * | 9/1997 | Huai et al. | 714/1 |
| 6,728,849 | B2 * | 4/2004 | Kodama | 711/162 |
| 6,816,951 | B2 * | 11/2004 | Kimura et al. | 711/162 |
| 6,898,685 | B2 * | 5/2005 | Meiri et al. | 711/167 |
| 2002/0042866 | A1 * | 4/2002 | Grant et al. | 711/162 |
| 2003/0051111 | A1 * | 3/2003 | Nakano et al. | 711/162 |
| 2003/0188114 | A1 * | 10/2003 | Lubbers et al. | 711/162 |
| 2004/0210731 | A1 * | 10/2004 | Chatterjee et al. | 711/165 |

* cited by examiner

*Primary Examiner*—Sanjiv Shah
*Assistant Examiner*—Jae U Yu
(74) *Attorney, Agent, or Firm*—David W. Victor; Konrad Rayner & Victor LLP

(57) ABSTRACT

Provided are a method, system, and program for copying tracks between a primary controller and secondary controller. A track is received from the primary controller that is part of a copy job comprising a sequence of tracks to copy along with a sequence number of the received track and a context number identifying computational resources in the primary controller used to transmit the track, sequence number, and context number. The context number and sequence number transmitted with the track are used to determine if a track preceding the received track was written to storage. The secondary-controller writes the received track to storage if the track preceding the received track was written to storage.

24 Claims, 7 Drawing Sheets

US 7,451,283 B2

METHOD, SYSTEM, AND PROGRAM FOR COPYING TRACKS BETWEEN A PRIMARY STORAGE AND SECONDARY STORAGE

BACKGROUND OF THE INVENTION

1. Field of the Invention

The present invention relates to a method, system, and program for copying tracks between a primary storage and secondary storage.

2. Description of the Related Art

Data storage systems may maintain a secondary copy of data at a remote site to use in the event of a failure at the primary site. Such dual or shadow copies are typically made as the application system is writing new data to a primary storage device. International Business Machines Corporation (IBM®), the assignee of the subject patent application, provides two systems for maintaining remote copies of data at a secondary site, extended remote copy (XRC) and peer-to-peer remote copy (PPRC). These systems provide a method for recovering data updates between a last, safe backup and a system failure. Such data shadowing systems can also provide an additional remote copy for non-recovery purposes, such as local access at a remote site. These IBM XRC and PPRC systems are described in IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary storage and a secondary storage controller may be provided to control access to the secondary storage.

In PPRC mirroring, host updates may be copied synchronously or asynchronously. If the host writes the updates synchronously, then the primary storage controller does not return acknowledgment of the write until the write completes at the secondary site, and acknowledgment is returned to the primary controller. If the host writes the updates asynchronously, then the primary storage controller returns the write acknowledgment immediately even before the data is physically-copied to the secondary storage.

Synchronous writing provides greater data security because the host does not continue until the host is ensured that the data has been applied at the secondary site in correct order. However, the delays in returning acknowledgment to the host required for synchronous remote copying may affect the operation of application programs accessing the host system waiting for write complete. Although the asynchronous copy mode may return acknowledgment to the host significantly faster than synchronous, the host still cannot be assured that the data has been applied in proper sequence at the secondary site, especially if data is lost during transmission through the network or fabric, such as a Storage Area Network (SAN).

SUMMARY

Provided are a method, system, and program for copying tracks between a primary controller and secondary controller. A track is received from the primary controller that is part of a copy job comprising a sequence of tracks to copy along with a sequence number of the received track and a context number identifying computational resources in the primary controller used to transmit the track, sequence number, and context number. The context number and sequence number transmitted with the track are used to determine if a track preceding the received track was written to storage. The secondary controller writes the received track to storage if the track preceding the received track was written to storage.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
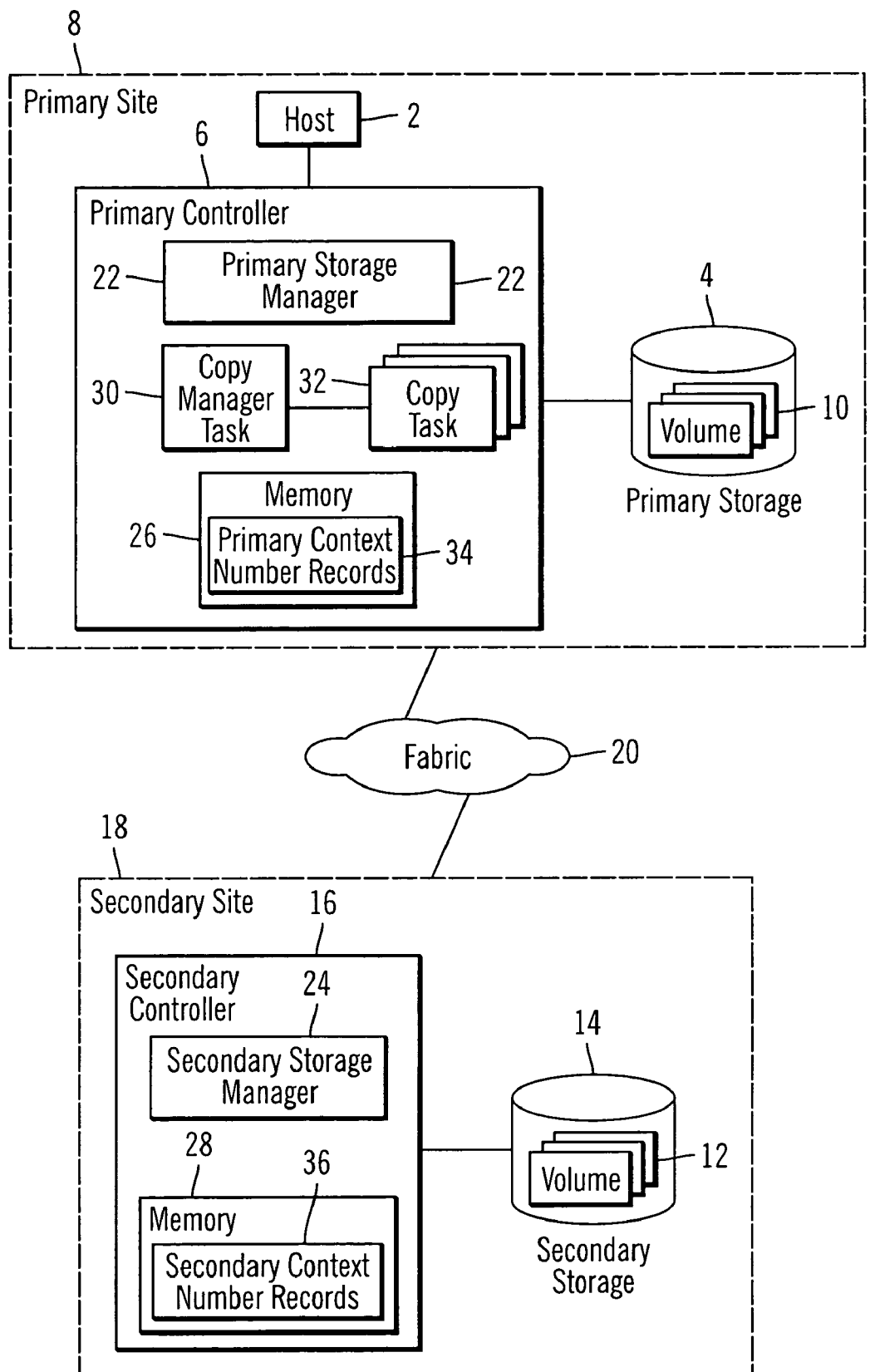
FIG. 1 illustrates a computing environment in which aspects of the invention are implemented.

FIG. 1 illustrates a network computing environment in which aspects of the invention are implemented. One or more hosts 2 (only one is shown) communicate Input/Output (I/O) requests to a primary storage 4 through a primary controller 6. The primary storage 4 and primary controller 6 are at a primary site 8. The hosts 2 may or may not be at the primary site 8. The primary storage 4 maintains data in one or more primary volumes 10, which may comprise logical volumes configured in the primary storage 4, such as logical unit numbers (LUNs), logical volumes, logical drives, etc. Certain of the volumes 10 in the primary storage 4 may be included in a copy relationship with corresponding secondary volumes 12 in a secondary storage 14. Data in one or more primary volumes 10 in the primary storage 4 subject to the copy relationship are transferred to the corresponding one or more secondary volumes 12 in secondary storage 14 via a secondary controller 16 at a secondary site 18 over a fabric 20. The fabric 20 may include direct connections between ports on the primary controller 6 and ports on the secondary controller 16 or comprise a series of one or more cascading switches in a path between ports on the primary controller 6 and secondary controller 16. In this way, the fabric 20 may provide one or more data transfer paths between the controllers 6 and 16. Alternatively, the fabric 20 may comprise a broadcast network, such as an Ethernet. Thus, the fabric 20 may implement networks known in the art, such as a Local Area Network (LAN), Storage Area Network (SAN), Wide Area Network (WAN), the Internet, an Intranet, etc. The secondary controller 16 stores host updates to the primary storage 4 in the secondary storage 14 in order to provide a mirror copy of the data at the primary storage 4.

The primary 6 and secondary 16 controllers may comprise any storage management system known in the art, such as a storage controller, server, enterprise storage server, etc. The primary 4 and secondary 14 storages may comprise any storage system known in the art, such as a Direct Access Storage Device (DASD), Just a Bunch of Disks (JBOD), a Redundant Array of Independent Disks (RAID), virtualization device, tape storage, optical disk storage, or any other storage system known in the art.

In certain implementations, the primary 8 and secondary 18 sites may be implemented in different power boundaries, such that the destruction or substantial failure at one site will not impact the data stored at the other sites. Further, the primary 8 and secondary 18 sites may be in different geographical locations, in a same building, but different floors or rooms, in different buildings in a same geographical location, or separated by a distance. Yet further, the primary 4 and secondary 14 storages may be at locations external to the primary 8 and secondary 18 sites, respectively.

A primary storage manager 22 performs data management operations at the primary controller 6 and a secondary storage manager 24 performs data management operations at the secondary controller 16. The primary and secondary controllers 6 and 16 each include a memory 26 and 28, respectively, which may comprise any volatile or non-volatile memory or storage device known in the art, that maintains the following information, which may be maintained in any data structure format known in the art.

The primary controller 6 executes a copy manager task 30 to manage the copy operations of updates received from the host 2 between the primary and secondary sites 8 and 18. A task may comprise a thread, process or any allocation of resources to allow for independent execution. In response to receiving the host update, the copy manager task 30 would spawn a new copy task 32 to manage the copying of the data, such as tracks, from the host 2 that is part of a separate copy job. Copy task 32 refers to one or more copy tasks. Multiple copy tasks 32 may execute in the primary controller 6 to allow for concurrent copying of updates to the secondary controller 16 over the fabric 20 for different copy jobs.

Figure 2:
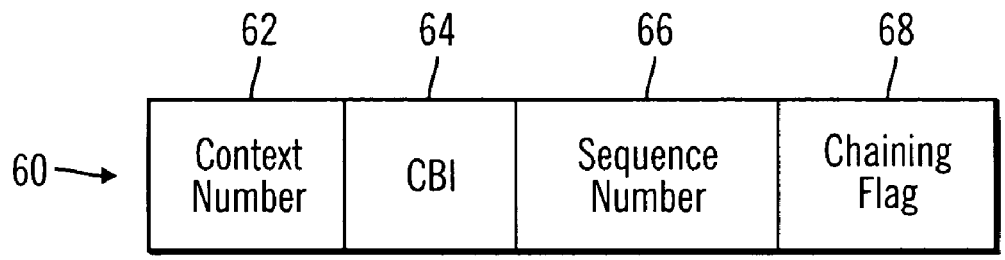
FIGS. 2, 3, and 4 illustrate information maintained at the primary and secondary controllers and transmitted with the tracks to manage copy operations in accordance with embodiments of the invention.

FIG. 2 illustrates I/O metadata 60 provided with each update transmitted from the primary 6 to the secondary 16 controllers, including:

Context Number 62: an identifier assigned by the primary controller 6 operating system to a copy task 32, comprising the computational resources allocated to process a copy job. The same context number identifying allocatable computational resources may be assigned to different copy tasks 32.

Content Base Index (CBI) 64: a number that is initially set to zero when a context number 62 is initialized to provide computational resources to allocate to copy tasks. The CBI 64 is incremented each time the computational resources represented by the context number 62 are allocated to a new copy task. Thus, the CBI 64 indicates the number of copy tasks to which the computational resources identified by context number 62 have been allocated and provides an index identifying the current copy job being processed by the copy task 32, which may be reused for different copy jobs.

Sequence Number 66: when a copy task 32 transmits a track as part of a copy job to transmit one or more tracks, a sequence number 66 is assigned to the track to ensure sequential copying of data between the controllers 6 and 16. In certain embodiments, the first sequence number of a copy job comprises the track number of the track being copied.

Chaining flag 68: A flag that when "on" indicates that the last sent track was sent without acknowledgment that the previously sent track completed. This flag 68 is reset when a new copy job begins.

Figure 3:
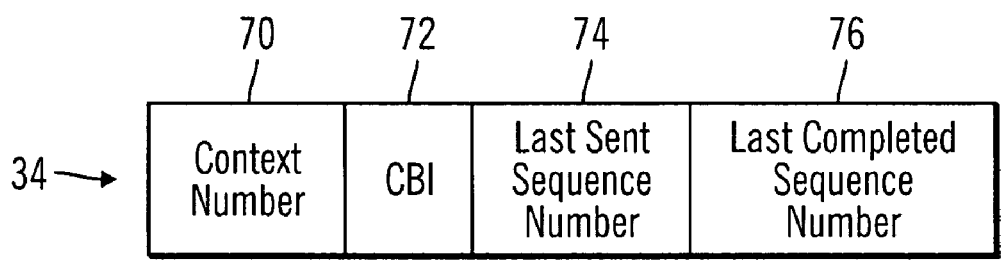

The primary controller 6 maintains primary context number records 34 providing information on copy tasks 32 that are currently executing copy jobs or previously executed copy jobs. The primary context number record 34 refers to one or more primary context number records. FIG. 3 illustrates information maintained with each primary context number record 34 providing information used by the primary controller 6 on a copy task 32 transferring tracks in a copy job from the primary 6 to secondary 16 controllers. Each record 34 includes the context number 70 of the copy task 32; the CBI 72; a last sent sequence number 74 comprising the sequence number of the last track transmitted to the secondary controller 16 over the fabric 20; and a last completed sequence number 76 comprising the sequence number of the last transmitted track where "complete" acknowledgment was received from the secondary controller 16.

Figure 4:
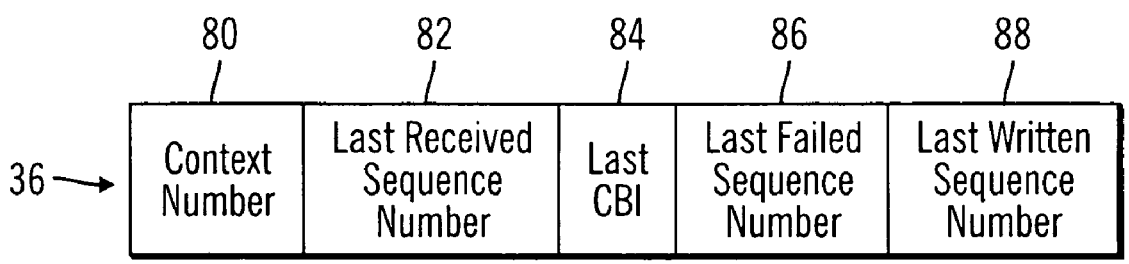

The secondary controller 16 maintains secondary context number records 36, each providing information on tracks received from one copy task 32. The secondary context number record 36 refers to one or more secondary context number records. FIG. 4 illustrates information maintained with each secondary context number record 36. Each record 36 includes:

Context Number 80: the code assigned by the primary controller 6 to identify the copy task 32, i.e., the computational resources allocated, that transmitted the tracks being written to the secondary storage 14.

Last Received Sequence Number 82: The sequence number, assigned by the primary controller 6 copy task 32, of the track last, i.e., most recently, received from the primary controller 6. This value is used to determine whether tracks are being received out of sequence.

Last Content Base Index (CBI) 84: The CBI, set by the primary controller 6, of the track last written to the secondary storage 14, where the CBI identifies the copy job processed by the computational resources identified by the context number 80.

Last Failed Sequence Number 86: The sequence number of a most recent track, associated with the context number 80, that the secondary controller 16 failed.

Last Written Sequence Number 88: The sequence number, assigned by the primary controller 6 copy task 32, of the track last, i.e., most recently, written to the secondary storage 14.

In certain synchronous copy embodiments, to optimize the copying process between the controllers 6 and 16, the primary controller 6 would stream multiple tracks that are part of a single copy job down a same path without waiting for an acknowledge complete before sending a next track in the copy job. The primary controller 6 can spawn multiple copy tasks to stream the tracks for different copy jobs down different paths to the secondary controller 16 to allow for the parallel transfer of tracks for different copy jobs. However, tracks may be lost when traveling over the paths in the fabric 20 due to errors that occur within the fabric 20 components, such as the cables, switches, etc. One concern when the primary controller 6 streams the tracks to the secondary 16 before receiving acknowledgment is that the secondary controller 16 may write a track out of sequence, resulting in a "hole" in the data written to the secondary storage 14. This problem is exasperated if the primary controller 6 continues to use a bad path losing tracks to transmit the tracks in a copy job. If the secondary controller 16 cannot detect out-of-sequence transmissions, then the secondary controller 16 may write numerous tracks out of sequence, resulting in numerous data "holes".

The embodiments of FIGS. 5-9 describe operations performed by the primary 6 and secondary 16 controllers to handle track writing to avoid the situation where the secondary controller 16 would write tracks out of sequence when the primary controller 6 transmits numerous tracks down a path to the secondary controller 16 before receiving synchronous acknowledgment.

Figure 5:
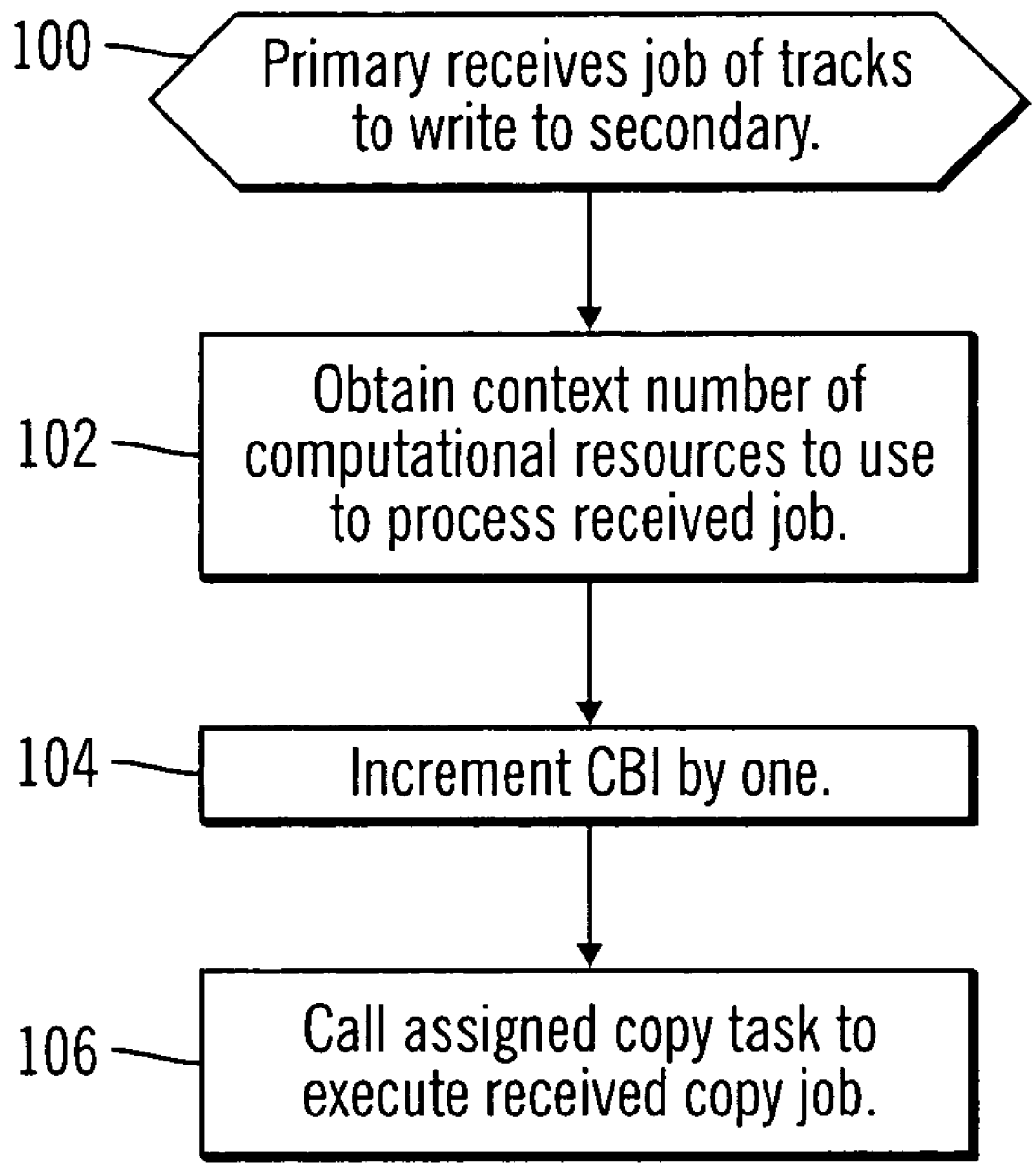
FIGS. 5, 6, 7, 8, and 9 illustrate operations performed to copy tracks from the primary to secondary controller in accordance with embodiments of the invention.

FIG. 5 illustrates operations performed by the copy manager task 30 upon receiving (at block 100) a copy job from a host 2 comprising one or more sequential tracks to write to the secondary storage 14. The copy manager task 30 would obtain (at block 102) a context number identifying allocatable computational resources to use to process the received job, including a set of sequential tracks in the primary storage 10 to copy to the secondary storage 14. The context number and associated computational resources would be assigned by the operating system (not shown) at the primary controller 6. Primary context numbers 34 would have been previously initialized with an initial CBI value 72. The copy manager task 30 increments (at block 104) the CBI 62 for the context number record 34 by one and calls (at block 106) the assigned copy task 32 identified by the assigned context number to copy the tracks for the received copy job to the secondary storage 14.

Figure 6:
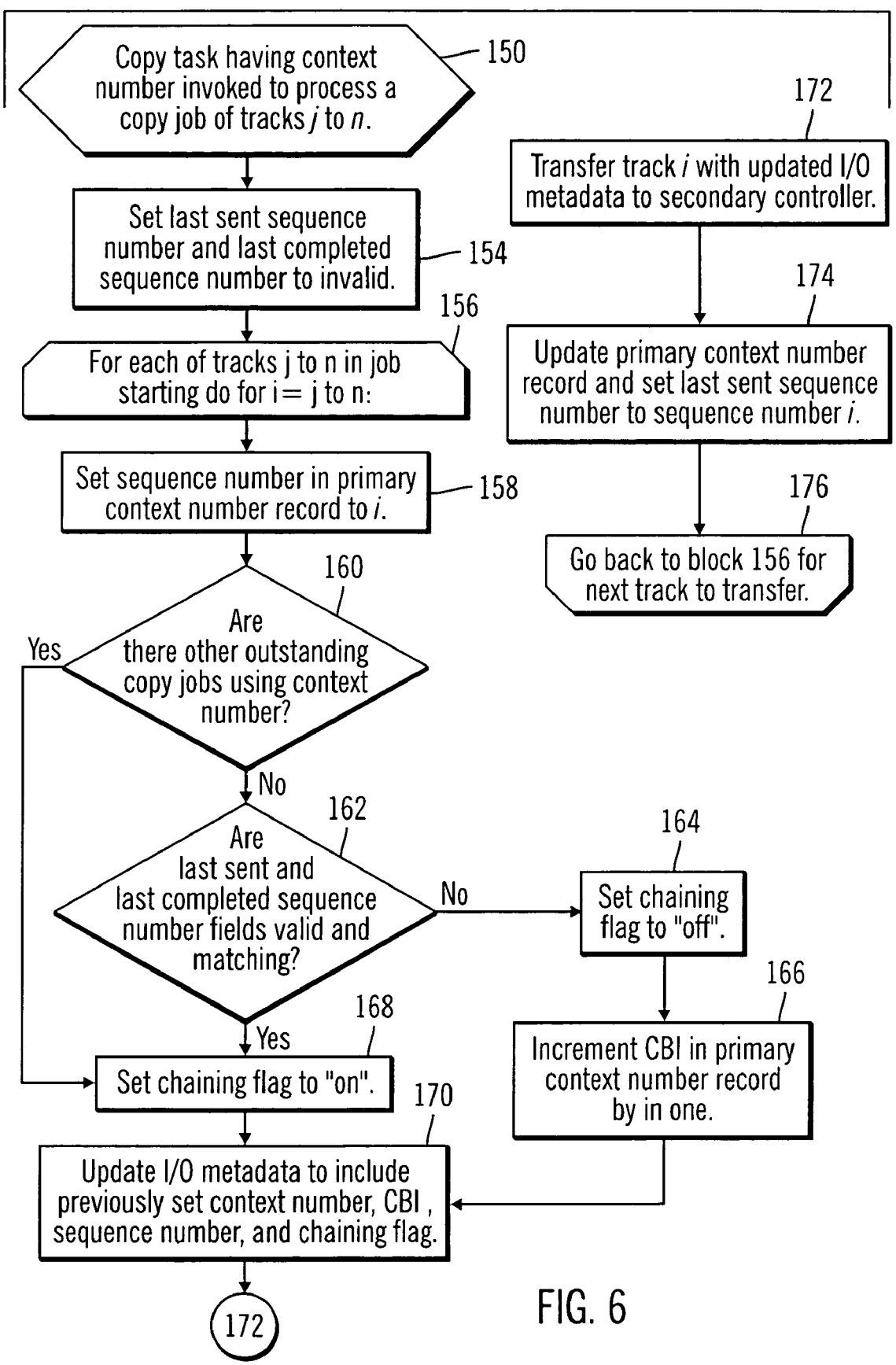

FIG. 6 illustrates operations the copy task 32 performs when invoked by the copy manager task 30 at block 106 in FIG. 5. The copy task 32 is invoked (at block 150) to generate the I/O metadata 60 for transferring tracks j to n. The last sequence number 74 and the last completed sequence number 76 fields in the primary context number record 34 are set (at block 154) to invalid. The copy task 32 then performs a loop at blocks 156 through 176 for each of the tracks in the copy job, i.e., tracks j to n. At block 158, the copy task 32 sets the sequence number to i. If (at block 160) there are no outstanding copy jobs using the context number and if (at block 162) the last sent 64 and last completed 66 sequence numbers are valid and match, then the chaining flag 68 is set (at block 164) to "off" and the CBI 72 in the primary context number record 34 is incremented (at block 166). If there are other outstanding copy jobs using the context number (from the yes branch of step 160 or from the yes branch of block 162), then the chaining flag 68 is set to "on" to indicate that acknowledgment has not been received that the track or copy job preceding the track or copy job, respectively, being processed has completed.

From steps 166 or 168, the copy task 32 updates (at block 170) the I/O metadata 60 to include the context number, CBI, and sequence number updated in the primary context number record 34 in fields 62, 64, and 66, respectively, and include the set chaining flag 68.

The copy task 32 then transfers (at block 172) track i with the updated I/O metadata 60 to the secondary controller 16 and updates (at block 174) the primary context number record by setting the last sent sequence number 74 to the sequence number i. Control then proceeds (at block 176) back to block 156 to process any further tracks in the copy job.

With the operation of FIG. 6, the primary controller 6 spawns a copy task 32 to stream as many tracks as possible for a copy job down a path through the fabric 20 to the secondary controller 16 to optimize the write operations.

Figure 7:
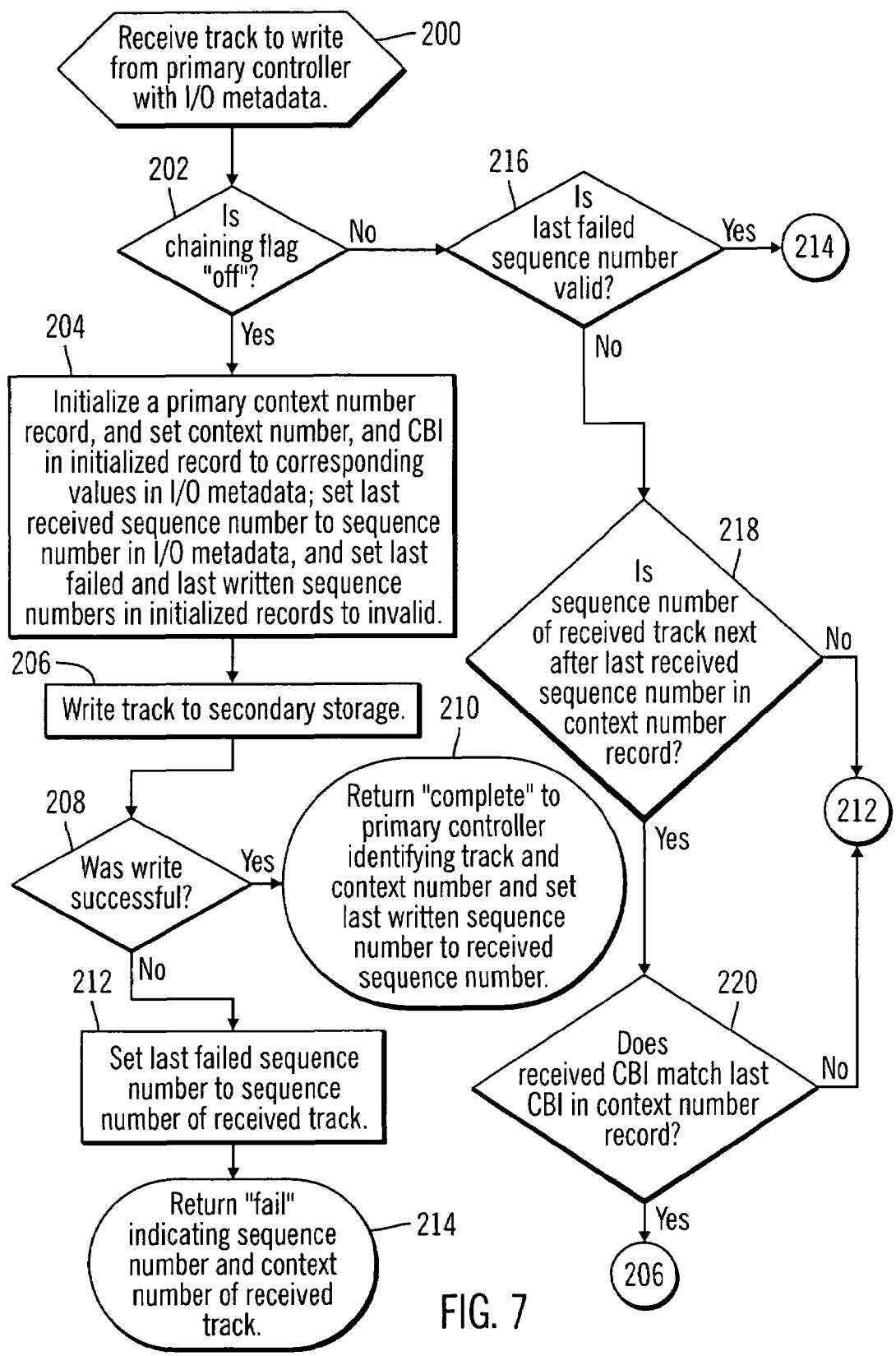

FIG. 7 illustrates operations performed by the secondary storage manager 24 to process a track received (at block 200) as part of a copy job including the I/O metadata 60. If (at block 202) the chaining flag 68 is "off", indicating that the track preceding the transmitted track completed, then a secondary context number record 36 is initialized by setting (at block 204) the context number 80 (FIG. 4) and CBI 84 in the initialized record 36 to the corresponding values in the I/O metadata, 62, 66, and 64; setting the, last received sequence number 82 to the sequence number in the I/O metadata; and setting the set last failed 86 and last written 8 sequence numbers in the initialized secondary record 36 to invalid. The received track is then written (at block 206) to the secondary storage 14.

If (at block 208) the write was successful, then the secondary controller 16 returns (at block 210) "complete" to the primary controller 6 identifying the track and context number, and sets the last written sequence number 88 to the received sequence number. Otherwise, if (at block 208) the write failed, then the last failed sequence number 86 (FIG. 4) is set (at block 212) to the sequence number 66 (FIG. 2) of the received track and "fail" is returned (at block 214) to the primary controller 6 indicating the sequence number and context number of the received track.

If (at block 202) the chaining flag 68 in the received I/O metadata 60 is on indicating that the primary controller 6 did not receive acknowledgment that the previously sent track completed or another copy job using the same context number has completed, then the secondary storage manager 24 determines (at block 216) whether the last failed sequence number 86 in the secondary context number record 36 is valid. If so, then the last track failed and control proceeds to block 214 to return fail. Otherwise, if the last failed sequence number 86 is invalid and if (at block 218) the sequence number 66 of the received track, indicated in the I/O metadata 60, does not follow the last received sequence number 82 indicated in the secondary context number record 36, then the received track cannot be written because there is a track missing between the received track and the last written track indicated in field 82. In such case, control proceeds to block 212 to fail the request.

Otherwise, if (at block 218), the received track sequence number does directly follow the last received sequence number 82, then a determination is made (at block 220) whether the CBI received with the track matches the last CBI 85 in the secondary context number record 36. This check is performed to determine whether the last received sequence number 82 in the record was written was part of the current copy task, identified by the CBI sent with the track or a previous copy task, which occurs if the last CBI 84 differs from the received CBI 64 (FIG. 2). If the CBIs differ and indicate that the last written sequence number 88 pertains to a previous copy job, then the context number record 36 does not accurately reflect the last received sequence number for the current copy job being processed. In such case of the CBIs not matching, control proceeds to block 212 to fail the copying of the received track. Otherwise, if (at block 220) the compared CBIs 64 and 84 match, then control proceeds to block 206 to write the received track.

The operations of FIG. 7 ensure that the secondary controller 16 does not write a track received as part of a copy operation if the secondary controller 16 cannot make certain that the previous track in the sequence was successfully written so as to avoid forming "holes" in the sequential data, which occurs if the secondary controller 16 does not write the data in proper sequential order.

Figure 8:
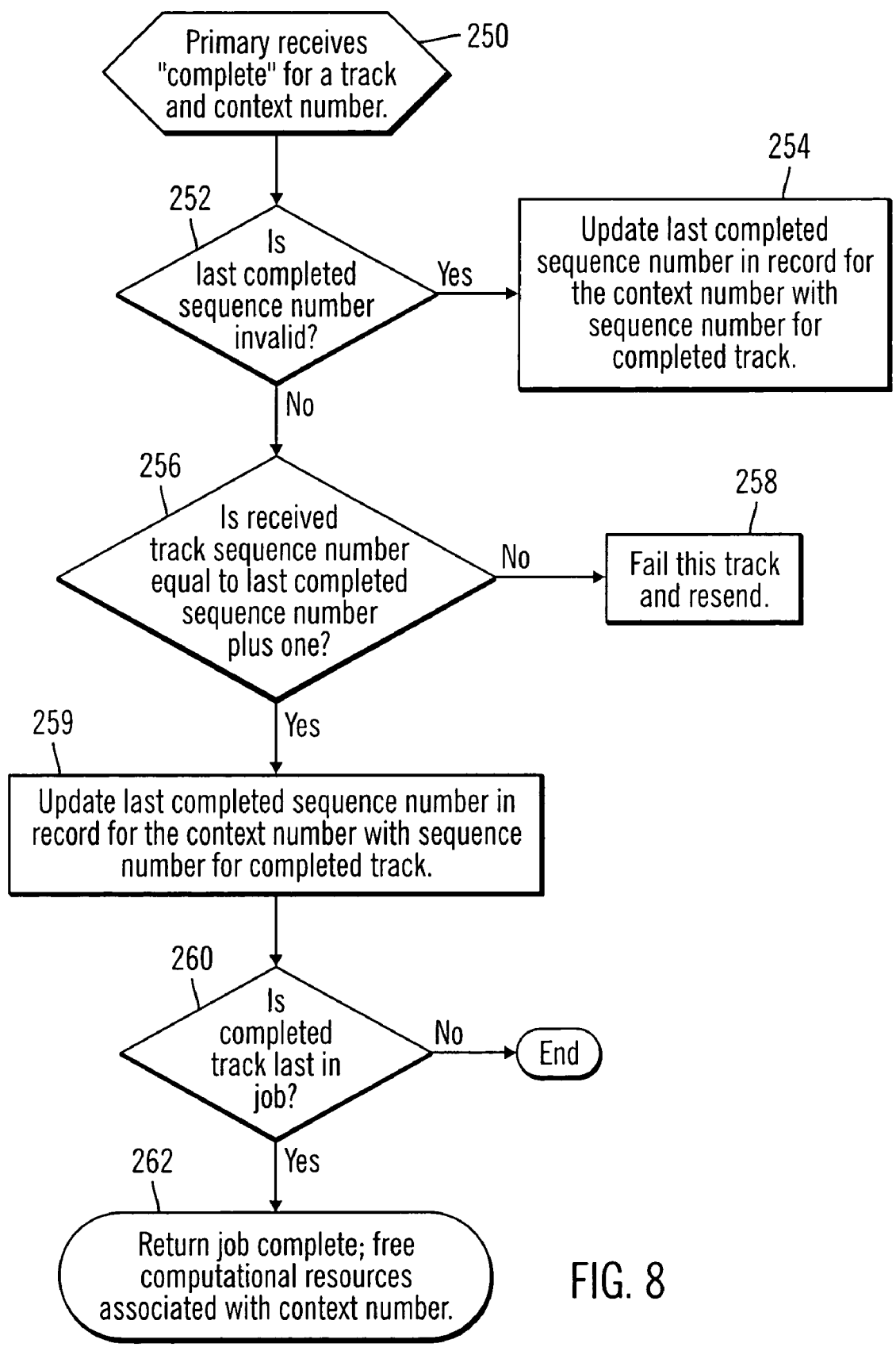

FIG. 8 illustrates operations performed by the primary storage manager 22 upon receiving (at block 250) "complete" for a track and sequence number from the secondary controller 16. In response, if (at block 252) the last completed sequence number 76 in the primary context number record 34 (FIG. 3) is invalid, then the last completed sequence number 76 in the record 34 for the identified context number is updated (at block 254) with the sequence number of the completed track. If (at block 252) the last completed sequence number 76 is not invalid and if (at block 256) the receive track sequence number is not equal to the last completed sequence number 76 plus one, i.e., complete was received out of sequence, then the writing of the track is failed (at block 258) and retried. Otherwise, if (at block 256) the complete is received for the next track sent, then the last completed sequence number 76 in the primary context number record 34 is updated (at block 259) with the sequence number 66 (FIG. 2) for the completed track. If (at block 260) the completed track is the last in the job being processed by the copy task, then "complete" is returned (at block 262) for the job and the computational resources associated with the context number are freed and available for allocation to an additional copy task 32. Otherwise, if the completed track is not the last in the job, then control ends.

Figure 9:
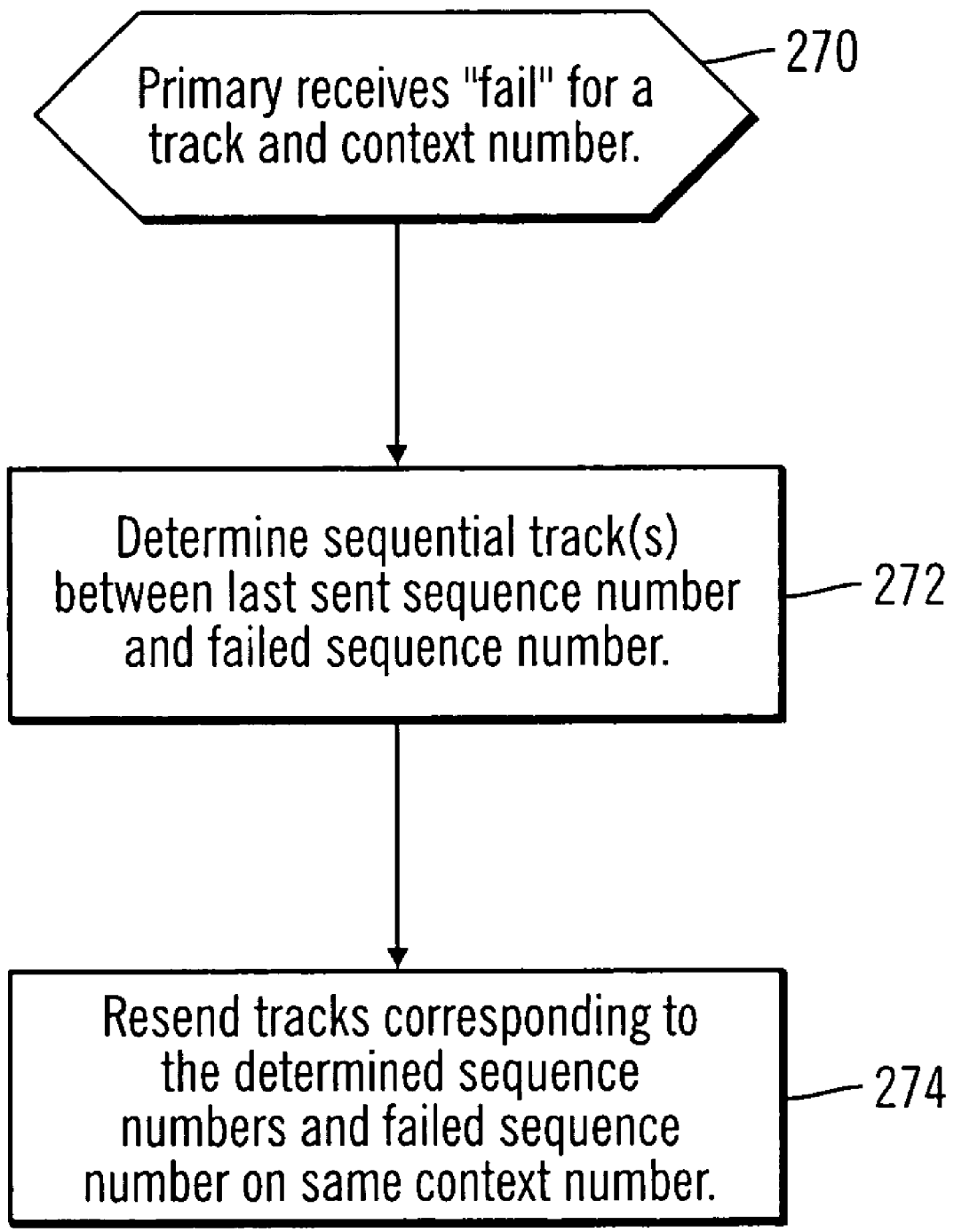

FIG. 9 illustrates operations the primary storage manager 22 performs in response to receiving (at block 280) a "fail" message from the secondary controller 16 for a track and context number. In response to receiving the "fail" message, a determination is made (at block 282) of the sequential track(s) between the last sent sequence number 64 in the context number record 36 and the failed sequence number identified with the fail message. The primary storage manager 22 further resends (at block 284) the tracks corresponding to the determined sequence numbers and the failed sequence number. The operations in FIG. 9 may be performed by the same copy task 32 that was handling the copy job or a different task.

In further embodiments, if a fail message is received, the tracks that are resent in FIG. 9 may be sent down a different path to the secondary controller 16 than used for the track that failed. Further, if no fail message has been received, then the copy task may continue to stream the tracks to the secondary controller down the same path.

ADDITIONAL EMBODIMENT DETAILS

The described embodiments for copying data between controllers may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disk, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described embodiments may be used to process synchronous writes from the host systems to ensure that data is copied in sequence before complete is returned to the host. For instance, the primary controller may only return complete to the host initiating the synchronous write after receiving the "complete" acknowledgment for the track from the secondary controller. In additional embodiments, the primary controller may only return complete after receiving complete for all tracks in the synchronous copy job initiated by the host. In alternative embodiments, the described copy operations may be performed for asynchronous writes to avoid writing data out of sequence at the secondary site even though complete may be immediately returned to the host initiating the asynchronous writes after the tracks are received at the primary controller 6.

The controllers 6 and 16 may include additional components and features typically found in enterprise storage servers, such as caching updates in a single cache or the additional use of a non-volatile storage to provide further backing-up of cached data.

The illustrated operations of FIGS. 5-9 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for copying tracks between a primary controller and secondary controller, comprising:

receiving a track from the primary controller that is part of a copy job comprising a sequence of tracks to copy along with a sequence number of the received track and a context number identifying computational resources in the primary controller assigned by the primary controller to a copy task used to transmit the track, sequence number, and context number as part of the copy job, wherein the primary controller executes multiple copy tasks to copy tracks to the secondary controller for different copy jobs, wherein different context numbers identify different copy tasks in the primary controller copying tracks to the secondary controller as part of different copy jobs;

receiving, with the received track, an index associated with the context number identifying one copy task, wherein the index is incremented when the computational resources identified by the context number are assigned to a new copy task;

using the context number and sequence number transmitted with the track to determine if a track preceding the received track was written to storage; and writing with the secondary controller the received track to storage if the track preceding the received track was written to storage;

updating a record for the context number included with the transmitted track indicating the context number and a last written sequence number of the track recently written to the storage, and wherein the preceding track is determined to not have been written to storage if the received sequence number does not sequentially follow the last written sequence number in the record; and updating the record for the context number with the index included with the received track in response to updating the last written sequence number of the track.

2. The method of claim 1, further comprising:

returning with the secondary controller failure if the track preceding the received track was not written to the storage, wherein the returned failure indicates the context number identifying the copy task that sent the track.

3. The method of claim 1, wherein using the context number and sequence number transmitted with the track to determine if a track preceding the received track was written to storage further comprises the secondary controller performing:

determining whether the index in the record matches the index included with the received track in response to determining that the received track sequentially follows the last written sequence number indicated in the record; and writing the received track to the storage in response to determining that the indexes match.

4. The method of claim 3, further comprising:

returning, by the secondary controller, failure to the primary controller if the track preceding the received track was not written to the storage.

5. The method of claim 1, wherein the track is written to a primary storage managed by the primary controller and a secondary storage managed by the secondary controller, wherein the sequential tracks in the copy job are part of a synchronous write from a host communicated to the primary controller, and wherein the primary controller streams the tracks in the copy job to the secondary controller.

6. The method of claim 1, further comprising:

receiving at the secondary controller a flag indicating whether tracks in the copy job were sent and completed in sequence at the primary controller, wherein the track is written to the storage if the flag indicates that tracks in the copy job were sent and completed in sequence at the primary controller transmitting the tracks; and writing, by the secondary controller, the track to the storage if the flag indicates that tracks in the copy job were not sent and completed in sequence at the primary controller and if the sequence number of the received track follows a sequence number of a last written track associated with the context number of the copy task that sent the track.

7. The method of claim 6, further comprising:

returning, by the secondary controller, fail to the primary controller if the flag indicates that tracks in the copy job were not sent and completed in sequence at the primary controller and if the sequence number of the received track does not follow the sequence number of the last written track.

8. A system for copying tracks received from a primary controller, comprising:

a secondary controller;

a storage;

code executed by the secondary controller to perform:

receiving a track from the primary controller that is part of a copy job comprising a sequence of tracks to copy along with a sequence number of the received track and a context number identifying computational resources in the primary controller assigned by the primary controller to a copy task used to transmit the track, sequence number, and context number as part of the copy job, wherein the primary controller executes multiple copy tasks to copy tracks to the secondary controller for different copy jobs, wherein different context numbers identify different copy tasks in the primary controller copying tracks to the secondary controller as part of different copy jobs;

receiving with the received track an index associated with context number identifying one copy task, wherein the index is incremented when the computational resources identified by the context number are assigned to a new copy task;

using the context number and sequence number transmitted with the track to determine if a track preceding the received track was written to storage; and writing the received track to storage if the track preceding the received track was written to storage;

updating a record for the context number included with the transmitted track indicating the context number and a last written sequence number of the track recently written to the storage, and wherein the preceding track is determined to not have been written to storage if the received sequence number does not sequentially follow the last written sequence number in the record; and updating the record for the context number with the index included with the received track in response to updating the last written sequence number of the track.

9. The system of claim 8, wherein the code executed by the secondary controller further performs:

returning failure to the primary controller if the track preceding the received track was not written to the storage, wherein the returned failure indicates the context number identifying the copy task that sent the track.

10. The system of claim 8, wherein using the context number and sequence number transmitted with the track to determine if a track preceding the received track was written to storage further comprises performs:

determining whether the index in the record matches the index included with the received track in response to determining that the received track sequentially follows the last written sequence number indicated in the record; and writing the received track to the storage in response to determining that the indexes match.

11. The system of claim 10, wherein the code executed by the secondary controller further performs:

returning failure to the primary controller if the track preceding the received track was not written to the storage.

12. The system of claim 8, wherein the storage comprises a secondary storage, and wherein the track is written to a primary storage managed by the primary controller, wherein the sequential tracks in the copy job are part of a synchronous write from a host communicated to the primary controller, and wherein the primary controller streams the tracks in the copy job to the secondary controller.

13. The system of claim 8, wherein the code executed by the secondary controller further performs:
receiving a flag indicating whether tracks in the copy job were sent and completed in sequence at the primary controller, wherein the track is written to the storage if the flag indicates that tracks in the copy job were sent and completed in sequence at the primary controller transmitting the tracks; and
writing the track to the storage if the flag indicates that tracks in the copy job were not sent and completed in sequence at the primary controller and if the sequence number of the received track follows a sequence number of a last written track associated with the context number of the copy task that sent the track.

14. The system of claim 13, wherein the code executed by the secondary controller further performs:
returning fail to the primary controller if the flag indicates that tracks in the copy job were not sent and completed in sequence at the primary controller and if the sequence number of the received track does not follow the sequence number of the last written track.

15. An article of manufacture comprising a computer readable storage medium including code executed by a processor for copying tracks between a primary controller and secondary controller, wherein the article of manufacture causes operations to be performed, the operations comprising:
receiving a track from the primary controller that is part of a copy job comprising a sequence of tracks to copy along with a sequence number of the received track and a context number identifying computational resources in the primary controller assigned by the primary controller to a copy task used to transmit the track, sequence number, and context number as part of the copy job, wherein the primary controller executes multiple copy tasks to copy tracks to the secondary controller for different copy jobs, wherein different context numbers identify different copy tasks in the primary controller copying tracks to the secondary controller as part of different copy jobs;
receiving, with the received track, an index associated with the context number identifying one copy task, wherein the index is incremented when the computational resources identified by the context number are assigned to a new copy task;
using the context number and sequence number transmitted with the track to determine if a track preceding the received track was written to storage; and
writing the received track to storage if the track preceding the received track was written to storage;
updating a record for the context number included with the transmitted track indicating the context number and a last written sequence number of the track recently written to the storage, and wherein the preceding track is determined to not have been written to storage if the received sequence number does not sequentially follow the last written sequence number in the record; and
updating the record for the context number with the index included with the received track in response to updating the last written sequence number of the track.

16. The article of manufacture of claim 15, wherein the operations further comprise:
returning failure if the track preceding the received track was not written to the storage, wherein the returned failure indicates the context number identifying the copy task that sent the track.

17. The article of manufacture of claim 15, wherein using the context number and sequence number transmitted with the track to determine if a track preceding the received track was written to storage further comprises:
determining whether the index in the record matches the index included with the received track in response to determining that the received track sequentially follows the last written sequence number indicated in the record; and
writing the received track to the storage in response to determining that the indexes match.

18. The article of manufacture of claim 17, wherein the operations further comprise:
returning failure to the primary controller if the track preceding the received track was not written to the storage.

19. The article of manufacture of claim 15, wherein the track is written to a primary storage managed by the primary controller and a secondary storage managed by the secondary controller, wherein the sequential tracks in the copy job are part of a synchronous write from a host communicated to the primary controller, and wherein the primary controller streams the tracks in the copy job to the secondary controller.

20. The article of manufacture of claim 15, wherein the operations further comprise:
receiving a flag indicating whether tracks in the copy job were sent and completed in sequence at the primary controller, wherein the track is written to the storage if the flag indicates that tracks in the copy job were sent and completed in sequence at the primary controller transmitting the tracks; and
writing the track to the storage if the flag indicates that tracks in the copy job were not sent and completed in sequence at the primary controller and if the sequence number of the received track follows a sequence number of a last written track associated with the context number of the copy task that sent the track.

21. The article of manufacture of claim 20, wherein the operations further comprise:
returning fail to the primary controller if the flag indicates that tracks in the copy job were not sent and completed in sequence at the primary controller and if the sequence number of the received track does not follow the sequence number of the last written track.

22. The method of claim 1, wherein the context numbers assigned to different copy task comprise a same or different context numbers.

23. The system of claim 8, wherein the context numbers assigned to different copy task comprise a same or different context numbers.

24. The article of manufacture of claim 15, wherein the context numbers assigned to different copy task comprise a same or different context numbers.

* * * * *